July 3, 1923.

H. C. HUGHES

FRYING PAN

Filed Feb. 20, 1922

1,460,380

2 Sheets-Sheet 1

INVENTOR:
Hiram C. Hughes

By
ATTORNEYS:

July 3, 1923.

H. C. HUGHES

FRYING PAN

Filed Feb. 20, 1922

1,460,380

2 Sheets-Sheet 2

INVENTOR:
Hiram C. Hughes.
By
ATTORNEYS

Patented July 3, 1923.

1,460,380

UNITED STATES PATENT OFFICE.

HIRAM C. HUGHES, OF BOSTON, MASSACHUSETTS.

FRYING PAN.

Application filed February 20, 1922. Serial No. 537,775.

*To all whom it may concern:*

Be it known that I, HIRAM C. HUGHES, of Boston, in the county of Suffolk and State of Massachusetts, a citizen of the United States, have invented a new and useful Improvement in Frying Pans, of which the following is a specification.

My invention relates to an improvement in frying pans wherein, while the greater part of the floor of the pan is substantially flat so as to support properly the article to be cooked, gutters are provided to allow the greater part of the fat to drain off while leaving enough in contact with the article to be cooked to prevent it from sticking to the pan or getting burnt.

My invention will be understood by reference to the drawings in which it is shown in its preferred form.

Figure 1:
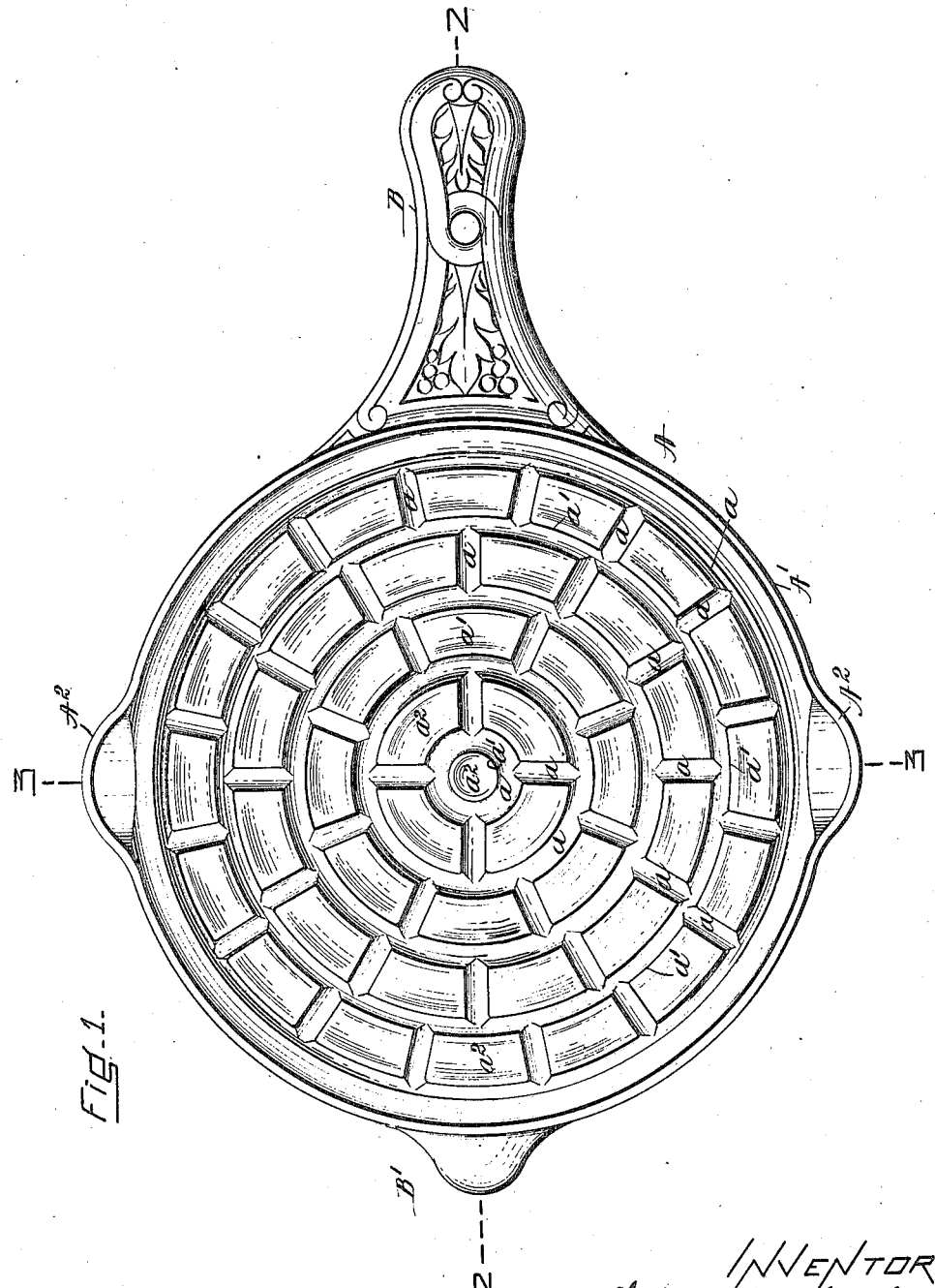

Figure 1 is a plan of a frying pan embodying my invention.

Figure 2:
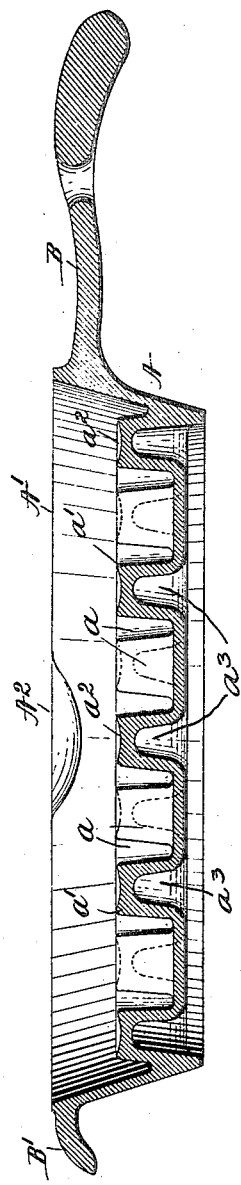
Figure 3:
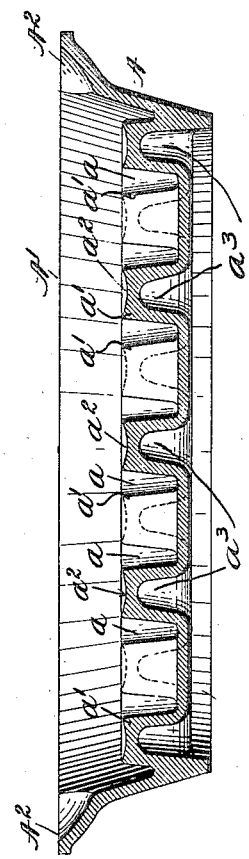

Figs. 2 and 3 being cross sections on lines 2—2 and 3—3 of Fig. 1.

A is the pan provided with sides $A^1$ and lips $A^2$ for pouring the liquid therefrom. B is the handle and $B^1$ is a rest to engage the edge of a stove hole or other support.

The floor of the pan is continuous or imperforate and is provided with gutters $a$ which preferably are all connected together and have between them supports $a^1$ for the article to be cooked. These supports form the greater part of the flooring and each is preferably provided with a shallow concavity $a^2$ which may receive and hold a small amount of the drippings from the article being cooked,—enough to prevent the article from sticking to the pan. If these concavities get full they are such that the liquid will overflow therefrom.

My pan may be cast or stamped out from thin metal, and it will be noticed that it is of substantially equal thickness throughout. Each support has a pocket $a^3$ underneath it so that the flames and gases will collect therein and furnish the necessary heat for cooking. The upper sides of these supports are of considerable extent and serve as a nearly continuous substantially level cooking surface for the pan. The under sides of these supports are exposed directly to the heat of the fire and are separated from each other by gutters sufficiently wide to collect the drippings but not wide enough to deprive the material to be cooked of the heat necessary for properly cooking it.

The improved pan is unlike a wire broiler in that all the juices resulting from the cooking are preserved and yet all parts of the article to be cooked are subjected to an equal and high degree of heat because of the heat-collecting pockets under the supports so that the article is cooked by the heat of the metal and not directly by the fire. The concavities on top of each support collect enough of the juices to keep the article from sticking to the pan.

I do not mean to limit myself to the precise arrangement of supports and connected gutters shown, though I have found this arrangement very satisfactory.

What I claim as my invention is:—

A frying pan having a continuous, imperforate flooring comprising supports having cooking surfaces of considerable extent and a series of gutters located between said supports to catch the drippings from the articles being cooked, the under sides of said supports being recessed whereby they will form pockets to hold the heat from the fire, and the upper or cooking surfaces of said supports being formed concave so as to be adapted to receive and hold small amounts of grease drippings to prevent articles which are being cooked from sticking to the extended cooking surfaces.

HIRAM C. HUGHES.